Nov. 29, 1955 T. D. LINEBAUGH ET AL 2,725,143

PHONOGRAPH RECORD FILE

Filed Dec. 17, 1953

Theodore Devere Linebaugh
Isabelle L. Linebaugh
INVENTORS.

BY Clarence A. O'Brien
and Harvey B. Jacobson
Attorneys

United States Patent Office 2,725,143

Patented Nov. 29, 1955

2,725,143

PHONOGRAPH RECORD FILE

Theodore Devere Linebaugh and Isabelle L. Linebaugh, Alpena, Mich.

Application December 17, 1953, Serial No. 398,798

1 Claim. (Cl. 206—62)

The present invention relates to new and useful improvements in disc type phonograph record files for use particularly in conjunction with automatic record players and has for its primary object to provide, in a manner as hereinafter set forth, a device of this character comprising a novel construction and arrangement whereby a stack of records may be expeditiously positioned on the turntable of the instrument and removed therefrom without the necessity of touching said records with the hands, which frequently leaves grease or perspiration spots on said records to which dust, etc., will adhere.

Other objects of the invention are to provide a phonograph record file of the aforementioned character which will be comparatively simple in construction, durable, compact, strong and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein.

Figure 1:
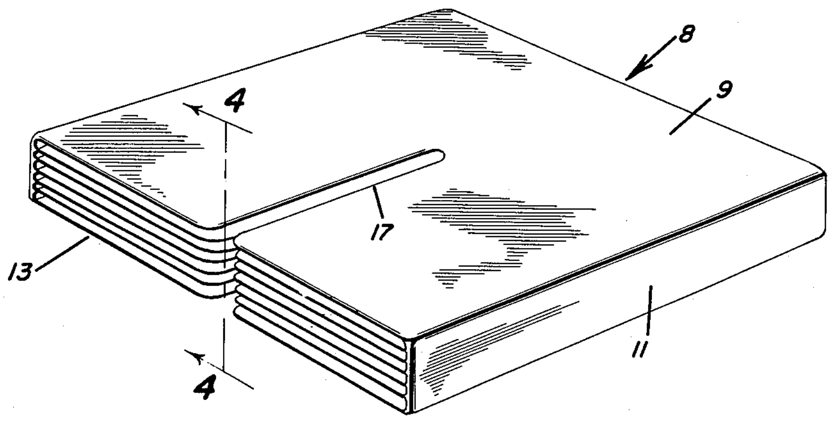
Figure 1 is a perspective view of a phonograph record file constructed in accordance with the present invention.

Referring now to the drawing in detail, it will be seen that reference character 5 designates a portion of an automatic record player. The player 5 includes a conventional turntable 6 from the center of which the usual spindle 7 arises.

The embodiment of the present invention which has been illustrated comprises a substantially flat, square container of suitable dimensions and material which is designated generally by reference character 8. The container 8 includes a top 9, a bottom 10, side walls 11 and a back wall 12, said container being open at its front, as at 13.

Mounted horizontally in the container 8 is a plurality of partitions 14, said partitions being vertically spaced to define chambers 15 for the reception of the records as at 16.

Figure 4:
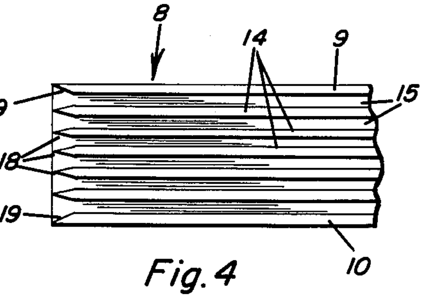
Figure 4 is a fragmentary view in elevation, looking in the direction of the arrows 4—4 in Figure 1 of the drawing.

Extending into the top 9, the bottom 10 and the partitions 14 of the container 8 from the open front 13 thereof are vertically aligned slots 17 for the reception of the spindle 7 of the player 5. The exposed or front edges of the partitions 14 are tapered, as at 18 (see Figure 4). The corresponding edges of the top 9 and the bottom 10 of the container 8 are oppositely beveled, as at 19.

Figure 2:
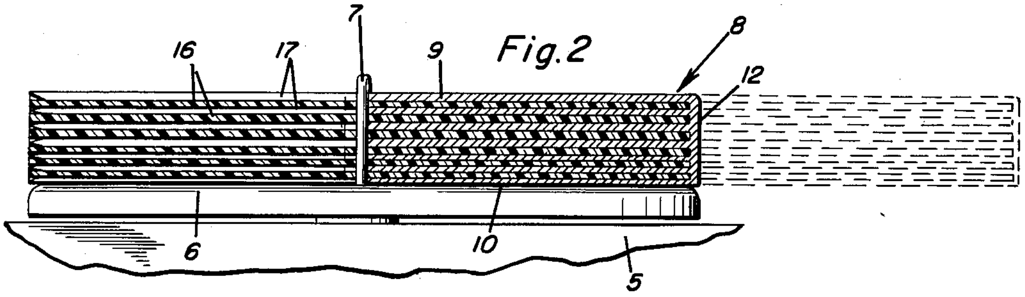
Figure 2 is a vertical sectional view, showing the file in use for placing a stack of records on the turntable of a player.
Figure 3:
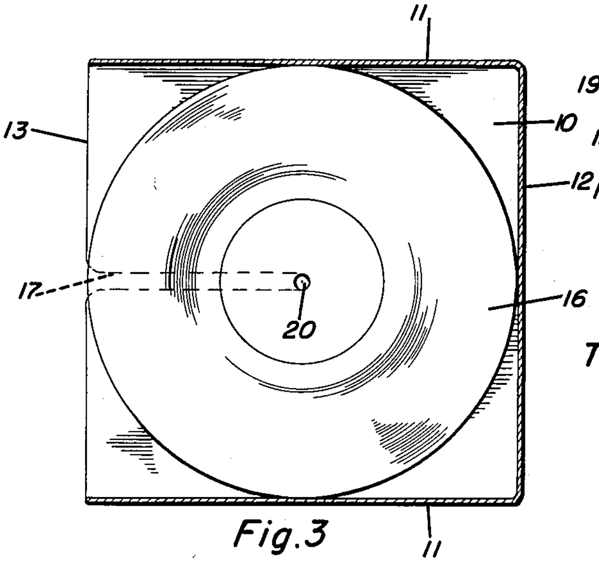
Figure 3 is a view in horizontal section through the device.

It is thought that the manner in which the file is used will be readily apparent from a consideration of the foregoing. Briefly, the records 16 are inserted in the compartments or chambers 15 of the container 8. When thus inserted the usual spindle openings 20 in the central portions of the record discs are aligned. To load the turntable 6 of the player 5, the container 8 with the records 16 therein is lowered onto said turntable, the spindle 7 projecting upwardly through the aligned or registering openings 20, the slots 17 accommodating said spindle. The container 8 is then shifted from left to right as suggested in broken lines in Figure 2 of the drawing. When this is done the spindle 7 anchors the records 16 and the container 8 is withdrawn therefrom for depositing said records in a stack on the machine. To remove the records from the turntable 6, the foregoing operation is substantially reversed, the tapered and beveled edges 18 and 19, respectively, facilitating the scooping of the records off the turntable into the compartments or chambers 15 of the container 8. The container 8 with the records therein is then lifted off the spindle 7.

It is believed that the many advantages of a phonograph record file constructed in accordance with the present invention will be readily understood and although a preferred embodiment of the device is as illustrated and described, it is to be understood that changes in the details of construction may be resorted to which will fall within the scope of the invention as claimed.

What is claimed is:

A phonograph record file of the character described comprising: a substantially flat, square container including a top and a bottom, said container being open at its front for the reception of phonograph records, vertically spaced horizontal partitions in the container defining compartments for the reception of the records, said top and bottom of said container including beveled front edges, said partitions including tapered front edges initially engageable between the records for separating same, said top and bottom and the partitions having vertically aligned, horizontal slots therein extending from the central portion of the container to the open front thereof for the reception of the spindle of a turntable of a record player.

References Cited in the file of this patent

UNITED STATES PATENTS

| | | |
|---|---|---|
| 331,385 | Durham | Dec. 1, 1885 |
| 1,404,193 | Dietsche, Jr. | Jan. 24, 1922 |
| 2,500,773 | Robins | Mar. 14, 1950 |
| 2,555,594 | Markovitz | June 5, 1951 |

FOREIGN PATENTS

| | | |
|---|---|---|
| 119,972 | Great Britain | Oct. 24, 1918 |
| 555,632 | Germany | July 28, 1932 |